Patented Sept. 11, 1951

2,567,258

UNITED STATES PATENT OFFICE 2,567,258

ENHANCING THE FEED VALUE OF DISTILLERS' SLOP

Ellis C. Pattee, Cincinnati, Ohio, assignor to National Distillers Products Corporation, a corporation of Virginia No Drawing. Application April 26, 1949, Serial No. 89,817

8 Claims. (Cl. 99—5)

This invention relates to new and useful improvements in enhancing the feed value of distillers' slop.

In the manufacture of distilled liquors and alcohol by the fermentation of cereals, such as wheat, corn, oats, barley, etc., or mixtures of the same, the cereal is mashed and then fermented and finally distilled. The remnants in the still are conventionally termed "distillers' slop" and contain soluble materials in solution and insoluble materials in suspension. The slops are usually separated from at least the coarser, suspended materials, by filtration, screening, centrifuging or other conventional means. The resulting slop contains the normally soluble solids in solution, and usually some additional solids remain in suspension, and is conventionally termed "thin slop."

The thin slops are usually worked up for the recovery of the solid materials therein, which usually includes their concentration by evaporation to a product of lesser bulk, commonly termed "evaporator syrup," and the drying of the latter by suitable conventional equipment, such as drying drums and the like. Depending, among other things, upon the particular mash bill and/or the particular conditions of mashing, fermentation and distillation and/or concentration, if any, the slops may contain after screening up to 50% by weight of solids. Thin slops usually contain about 2–8% of solids, while evaporator syrup does not normally contain in excess of about 30% of solids.

In ordinary sugar to alcohol fermentation of distillers' mashes, the conventional distillers' type yeast including brewers' yeast, Saccharomyces cerevisiae or the like yeast utilizes the normally fermentable sugars which are part of the mash medium and become available by conversion of the starchy material therein. The successful propagation of the ordinary distillers' type yeast is to a large extent dependent upon these sugars fermentable by the yeast. There are, however, certain pentose and hexose sugars or secondary combinations thereof which are not normally fermentable by the ordinary distillers' type yeasts. These specific pentose and hexose sugars present at least in part in secondary combinations (normally non-fermentable by ordinary distillers' type yeasts in the fermentation of distillers' mashes), appear in the distillers' slops and constitute a relatively large percentage of the normally solid "solubles" in the slops.

One object of the instant invention comprises, among others, the treatment of distillers' slops utilizing these normally non-fermented pentoses and hexoses (present at least in part in their secondary combinations) to thereby obtain slop materials of improved feed value.

I have discovered that Torulopsis utilis yeast and preferably the variety thermophila, can be grown under certain conditions and aerobic fermentation, to make use of these specific pentoses and hexoses as a source of energy for the propagation thereof to synthesize appreciable amounts of new protein material, vitamins and various growth factors and at the same time producing these materials in such balanced amounts and proportions that they are essentially contained in the ultimate product in amounts in excess of minimum chick growth requirements.

The treatment in accordance with the invention essentially comprises the inoculation of a distillers' slop containing not appreciably in excess of about 10% (and preferably from about 3 to 6%) of normally solid material by weight of the slop, at a temperature between 75 and 115° F., and preferably between 80 and 95° F. within a pH range of from 4–8 and preferably from 5–6 in the presence of ammonia not exceeding 5%, and preferably from 2–3% by weight of the normally solid materials in the slop for a period not exceeding 24 hours, under conditions of thorough continuous aeration.

The slop useful in accordance with the invention may be any slop derived as still residue (after removal of coarse particles) from any conventional fermented distillers' mash. Ordinary thin slops may be usually used as such. Alternatively, evaporator syrup, diluted to the required solids content, may be used. The upper limit of solid materials has proven critical in that effective propagation of the Torulopsis utilis will not proceed in a slop containing normally solid materials appreciably in excess of about 10%.

Within the preferred embodiment of the invention, I find it of advantage to maintain the fermentation mass well agitated. This may be accomplished mechanically but in most cases adequate aeration will effectively secure this end.

Especially good results are, however, obtained in some cases by supplementing aeration induced agitation by the action of a mechanical agitator.

Aeration may be accomplished in the usual manner by one or more perforated members such as pipes, and it is preferred to include a perforated loop or plate member positioned adjacent to the bottom of the fermenter. Alternatively, and this is the preferred procedure, aeration is accomplished by way of porous block or plate members such as of carbon, silicous, or other ceramic material, to which air is supplied, preferably under pressure. For best results, I find it of advantage to supply aeration at a rate of about 1–8 and preferably about 3–6 volumes of air per minute per volume of liquid in the fermenter.

In order to obtain a satisfactory actively growing yeast culture for inoculation of slops, in accordance with the invention, it is desirable to appropriately acclimatize the yeast culture and prepare a suitable inoculant therefrom. This may be, for instance, accomplished by using as the nutrient a slop-ammonia mixture having a solids content of the slop of about 3–6% and preferably approximating in composition and type that of the slop for which the inoculant is to be ultimately used. The ammonia content should be from 2–3% by weight of the solids in the slop, and should possess an adjusted pH of between 5.5 and 6. A hundred gram portion of this slop-ammonia medium is then added to a 50 × 400 millimeter test tube which is then plugged with cotton and provided with an aerator having an air supply tube and consisting of a fine "aloxite" sphere of about 2.54 cm. in diameter. The entire assembly of medium, aerator and connecting tube is sterilized by autoclaving for 30 minutes at 15 pounds pressure.

Cells of yeast growth of *Torulopsis utilis* var. *thermophila* on wort agar are transferred aseptically to the sterile slop medium, whereupon the tube is supported in a constant temperature water bath maintained at about 85° F. and the aerator connecting tube attached to a compressed air line. A calibrated flowmeter is cut into the air line and air is passed into the culture at a rate of about 4 cu. ft. per minute per cu. ft. of liquid. After 24 hours, 1 ml. portion of this yeast culture is transferred to a fresh tube of sterile slop-ammonia medium of the aforementioned composition and pH, and again aerated for 24 hours at 85° F. under the same conditions. The procedure is once more repeated to give a third growth period of 24 hours in a third proportion of sterile slop-ammonia medium. The entire yeasted medium from the third transfer is then used to inoculate a sterile 6 kg. portion of the same slop-ammonia medium. This culture is then aerated through twelve 3.45 cm. diameter "aloxite" spheres at a rate of 24 liters of air per minute, a small amount of corn oil being added to reduce excessive foaming. Aeration is continued for about 16 hours while the vessel is supported in a water bath maintained at 85° F. This yeasted medium is then ready to serve as acclimatized inoculant for the treatment of slops in accordance with the invention.

The following examples are furnished by way of illustration but not of limitation.

EXAMPLE I

An evaporator syrup slop containing about 11.1% solids was used. It constituted the concentrated still residue derived from a conventional bourbon mash bill. This slop was admixed with enough of 28% aqueous ammonia to bring the initial pH to about 5.5. This slop-ammonia mixture was then inoculated with 5% of the inoculant yeast (per volume of slop) prepared in the manner above set forth. The fermenter was kept at a constant temperature of between 83 and 87° F. by way of a warm water jacket, and air was introduced into the liquid in the fermenter by way of a perforated coil aerator, at a rate of about 4.10 cu. ft. per minute per cu. ft. of liquid therein. The total air added over a 20 hour period was about 712 cu. ft. per pound of solids in the slop. Samples were removed at regular intervals and examined for pH and yeast count in the conventional manner. Maximum growth time was indicated when no further appreciable increase in yeast count occurred. Whenever the pH dropped appreciably below 5, additional aqueous ammonia was added to bring the pH back to between 5.3 and 6. Total ammonia used was equivalent to about 2.21% of $NH_3$ by weight of solids in the slop. Maximum propagation was reached after a growth time of 20 hours with a final pH of 4.8, and a final yeast count of $4 \times 10^9$ per gram solids.

The vessel was so constructed that the depth of liquid over the perforated coil aerator was about 5.25 inches (for about 20 gallons total liquid). No mechanical mixer or agitator was used, the air being introduced into the perforated coil by way of a blower. The solids content of the yeasted product did not show any new protein content. The pertinent data of this example are set forth in Table I.

EXAMPLES II–XI

A series of fermentation runs were conducted using the same basic equipment, procedure, materials and conditions specified in Example I, except for certain variations as to the origin and solids content of the slop, the amounts and proportions of materials, and certain modifications in equipment. The data in connection with these runs are set forth in Table I, being there designated by the Example Numbers II to XI, setting forth in each case the particular modification in aeration, solids content of slop, total $NH_3$, rate of aeration and total air consumed, as well as amount of inoculant used, total growth time, final pH and yeast count and amount of new protein material, if any. The slops used in Examples II to XI were respectively as follows: Example II, the same slop as in Example I; Example III, a slop derived from a conventional bourbon mash bill; Example IV, a slop derived from a conventional degerminated corn spirits mash bill; Examples V, VI and VIII, slops of similar derivation as that of Example IV; Example VII, a slop derived from a conventional degerminated corn bourbon mash bill; Examples IX, X and XI, a slop derived from a conventional scratch corn spirits mash bill.

The data given in Table I for "air rate" are based on cu. ft. per minute of air per cu. ft. of liquid in the fermenter. Those for "per cent inoculum" are based on volume of fresh slop, while those for "total air" are calculated on cu. ft. per pound of solids in the untreated slop, and those for "per cent $NH_3$" on the basis of weight of solids in the untreated slop. The data for "per cent new protein" are based on weight of solids in the treated slop, and the data for "final yeast count" are furnished in terms of $10^9$ per gram of solids in the treated slop. In all of the examples, total slop-ammonia mixture used was about 20 gallons per batch.

Table I

| Ex. No. | Equipment | Slop Source | Slop Solids | Air Rate | Inoculum | Growth Time | Final pH | Final Yeast Count | New Protein | Total Air | NH₃ |
|---|---|---|---|---|---|---|---|---|---|---|---|
| | | | Per cent | | Per cent | Hours | | | Per cent | | Per cent |
| I | B | E. S. | 11.1 | 4.10 | 5 | 20 | 4.8 | 4 | ---- | 712 | 2.21 |
| II | A, B | E. S. | 11.1 | 4.15 | 5 | 20 | 4.9 | 6 | ---- | 718 | 2.21 |
| III | A, B | T. S. | 4.09 | 4.10 | 5 | 20 | 7.5 | 22 | 11.2 | 1,930 | 2.44 |
| IV | B | T. S. | 4.09 | 4.15 | 5 | 20 | 6.4 | 21 | 6.5 | 1,955 | 2.46 |
| V | A, B | T. S. | 4.09 | 4.15 | 1 | 20 | 8.0 | 21 | 8.1 | 1,955 | 2.46 |
| VI | A, B | T. S. | 4.09 | 5.20 | 25 | 12 | 7.2 | 26 | 9.4 | 1,465 | 2.46 |
| VII | C | T. S. | 4.09 | 1.86 | 5 | 20 | 4.7 | 4 | ---- | 875 | 2.48 |
| VIII | B | T. S. | 4.00 | 1.82 | 5 | 20 | 5.4 | 12 | 5.7 | 872 | 2.50 |
| IX | A, B | E. S. | 10.7 | 4.10 | 5 | 20 | 5.9 | 10 | 0.7 | 738 | 2.57 |
| X | A, B | T. S. | 3.05 | 3.12 | 5 | 10 | 7.8 | 31 | 11.7 | 960 | 2.58 |
| XI | B | C. T. S. | 7.23 | 4.00 | 6 | 10 | 4.8 | 6 | 3.5 | 535 | 3.19 |

NOTES: Temperature, 83 to 87° F. Pressure, atmospheric, except in Example VII, 13.7 pounds per square inch in excess of atmospheric. Depth of liquid over perforated coil aerator, 5.25 inches in Examples I to IX; 9.7 inches in Example XI; and 15.5 inches in Example X. A=mixer at 400 R. P. M.; B=blower; C=compressor; E. S.=evaporator syrup; T. S.=thin slop; C. T. S.= centrifuged concentrated thin slop.

As will be seen from the foregoing examples and Table I, relatively low yeast crops are obtained on slop in excess of 11% solids content (Examples I and II) and no new protein is synthesized. Thin slop containing solids between 10 and 11% (Example IX) shows a somewhat better yeast crop but still an insignificant amount of new proteins. Best results are obtained in the shortest time with thin slops containing the least solids and a high liquid depth over the aerator, as exemplified by Example X, having about three times a greater liquid depth over the aerator coil than provided in Examples I to IX. Pressure operation inhibits yeast propagation. Use of the agitator does not appreciably affect the yeast count but causes considerable increase in protein synthesis.

Yeast counts were made in accordance with conventional practice in the Levy counting chamber using dilutions of 1:1600 and compensating for differences in cell size by counting as one only those cells whose length was at least equal to the distance between double cross lines on the counting chamber (i. e., about 5 microns), counting as half all cells between approximately 5 and 2.5 microns, and not counting cells appearing less than 2.5 microns in length. The observed lengths of cells of the *Torulopsis utilis* var. *thermophila* range from less than 2.5 microns to over 15 microns, with the number of cells at either extreme being normally only a small fraction of the total. Yeast counts were determined in terms of billions of cells per gram of solids in accordance with the following formula:

yeast crop (billions per gram solids) =
$$\frac{\text{yeast count (millions per millimeter)}}{\text{per cent solids in medium} \times 10}$$

Thus, if a count of 750 million per millimeter is obtained in a medium having 5% solids, the yeast crop in billions per gram of solids would be $$\frac{750}{5 \times 10} = 15$$

Yeast crops up to 8 billion per gram of solids may be considered low crop products; of 9–17 billion per gram of solids, as intermediate; and of 18–24 billion per gram of solids, as high crop products.

After the fermentation of the slop is completed, the fermenter contents are removed and then dried in the conventional manner. This usually includes concentration by evaporation, preferably in vacuum, using, for instance, a conventional forced circulation evaporator until the solids concentration in the syrup reaches about 30%, at which point it becomes normally difficult to handle the syrup. Further evaporation may then be carried out by drying the evaporator syrup on suitable equipment such as conventional double drum rotary dryers under steam pressure, taking the dried sheets off the dryers and flaking and grinding the same.

In the following Table II, an analysis with respect to growth factors of a typical dried slop

Table II

| Material | Methionine, Per Cent | Lysine, Per Cent | Tryptophane, Per Cent | Phenylalanine, Per Cent | Valine, Per Cent | Leucine, Per Cent | Arginine, Per Cent | Threonine, Per Cent |
|---|---|---|---|---|---|---|---|---|
| Chick requirement | 0.5–1.0 | 0.9 | 0.2–0.5 | 1.0 | 1.0 | 1.0–2.0 | 0.9 | 0.5–1.0 |
| Dried product from Ex. X | 0.75 | 1.4 | 0.28 | 2.1 | 2.0 | 3.5 | 2.4 | 1.7 |

| Material | Isoleucine, Per Cent | Glutamic Acid, Per Cent | Histidine, Per Cent | Choline, Per Cent | Riboflavin, γ/gm. | Calcium Pantothenate, γ/gm. | Niacin, γ/gm. | Biotin, γ/gm. |
|---|---|---|---|---|---|---|---|---|
| Chick requirement | 0.8–1.0 | ---- | 0.15 | 0.15–0.25 | 3.0 | 7.5–15 | 18 | 0.15 |
| Dried product from Ex. X | 2.0 | 6.6 | 0.88 | 0.465 | 17.6 | 43 | 185 | 1.2 | product treated in accordance with the invention is shown in comparison with minimum values for growth factors established for chick feed requirements.

All data in the foregoing Table II are calculated as percent by weight of total dried product, to be used for feed. The dried product of Example X analyzed to about 93.6% solids, a yeast count of 17 billion per gram solids, a protein content of 39.8% (by weight solids) and ammonia of 0.61% (by weight solids).

Chick test growth examples conducted for the determination of feed value and growth deficiencies, if any, of the slop products treated in accordance with the invention, showed significant results in growth response. Thus, for instance, feeding with rations of yeasted slop materials prepared in accordance with the invention, showed growth at 8 weeks more than 106% ahead of growth of a control group fed a ration of unyeasted slop from which the yeasted product was prepared.

Aside from the enhanced feed values of the products in accordance with the instant invention, another very important advantage is realized in the practice of the new method. This resides in the fact that the dried material yeasted in accordance with the invention is considerably less hygroscopic than that of the untreated slops and is substantially free from caking tendencies. This is a factor of considerable importance to the feed trade, since quantity storage of feeds for long periods of time is unavoidable and is commonly practised. The treatment of slop in accordance with my invention substantially eliminates the highly objectionable caking problem and permits a hitherto not obtainable ease in handling and mixing even after prolonged storage.

Furthermore, the evaporator syrup resulting from the product of the invention dries more readily than an untreated evaporator syrup from the same slop stock. Normally, extensive difficulties are involved in the drying of untreated slop evaporator syrups on the drying drums which assert themselves primarily in that the material tends to roll off the knives of the dryer and will not satisfactorily form a sheet. For this reason, the drying of untreated slop syrups necessitates, in most cases, the use of ovens. These difficulties, however, are overcome by the practice of the invention in that the evaporator syrup of the product yeasted in accordance with the invention can be readily handled on the dryers, satisfactorily forming substantially non-hygroscopic substantially dry sheets that can be thereafter readily flaked and ground without necessity of further drying or other manipulation.

I claim:

1. Method of enhancing the feed value of the solid constituents normally present in distillers' slops which comprises inoculating a distillers' slop containing not appreciably in excess of 10% solids with a culture of *Torulopsis utilis*, thereafter holding the slop at a temperature of 75–115° F. within a pH range of from 4–8 in the presence of ammonia substantially not exceeding about 5% by weight of said solids, and for a period of time not exceeding about 24 hours, substantially continuously aerating the slop material throughout the said period, and thereafter recovering the solids from the treated slop in substantially dried form.

2. Method according to claim 1 in which said slop is mechanically agitated while being so aerated.

3. Method according to claim 1 in which a distillers' slop is inoculated containing from about 3–6% of normally solid material.

4. Method according to claim 3 in which said slop is held at a temperature of from 80–95° F., within a pH range of from 5–6, and in the presence of from 2–3% of ammonia by weight of said solids.

5. Method for enhancing the feed value of the solid constituent normally present in distillers' slops which comprises inoculating a distillers' slop containing from about 3% to 6% of normally solid material with a culture of *Torulopsis utilis*, thereafter holding the slop at a temperature of 80° F. to 95° F. within a pH range of 5–6 in the presence of ammonia, said ammonia being present in amount of from 2% to 3% by weight of said solid, and for a period of time not exceeding about 24 hours, substantially continuously aerating the slop material throughout the period at an aeration rate of about 1–8 volumes of air per minute per volume of liquid treated, and thereafter recovering the solids from the treated slop in substantially dry form.

6. Method according to claim 5 in which said slop is mechanically agitated while being so aerated.

7. Method of enhancing the feed value of the solid constituent normally present in distillers' slops which comprises inoculating a distillers' slop containing from about 3% to 6% of normally solid material with a culture of *Torulopsis utilis*, thereafter holding the slop at a temperature of from 80° F.–90° F. within a pH range of 5–6, and in the presence of from 2%–3% of ammonia by weight of said solids, and for a period of time not exceeding about 24 hours, substantially continuously aerating the slop material throughout the said period at a rate of about 3–6 volumes of air per minute per volume of liquid treated, and thereafter recovering the solid from the treated slop in substantially dry form.

8. Method according to claim 7 in which said slop is mechanically agitated while being so aerated.

ELLIS C. PATTEE.

REFERENCES CITED

The following references are of record in the file of this patent:

UNITED STATES PATENTS

| Number | Name | Date |
|---|---|---|
| 2,447,814 | Novak | Aug. 24, 1948 |

OTHER REFERENCES

"Microorganisms and Fermentation" by Jorgensen, 1948, p. 320.

"Production of Food Yeast," The Chemical Age, Aug. 5, 1944, pp. 125–128.

"Vitamin-Rich Food" by Burton Food Industries, Nov. 1943, p. 66.

"Value of Micro-organisms in Nutrition," Nature, Apr. 10, 1943, pp. 406–409.

"How Sweden Produces Yeast" by Rosenquist, Food Industries, June 1944, pp. 443 and 444.